March 15, 1927.  1,621,019
C. E. LYKINS
AEROPLANE
Filed Oct. 19, 1926   2 Sheets-Sheet 1
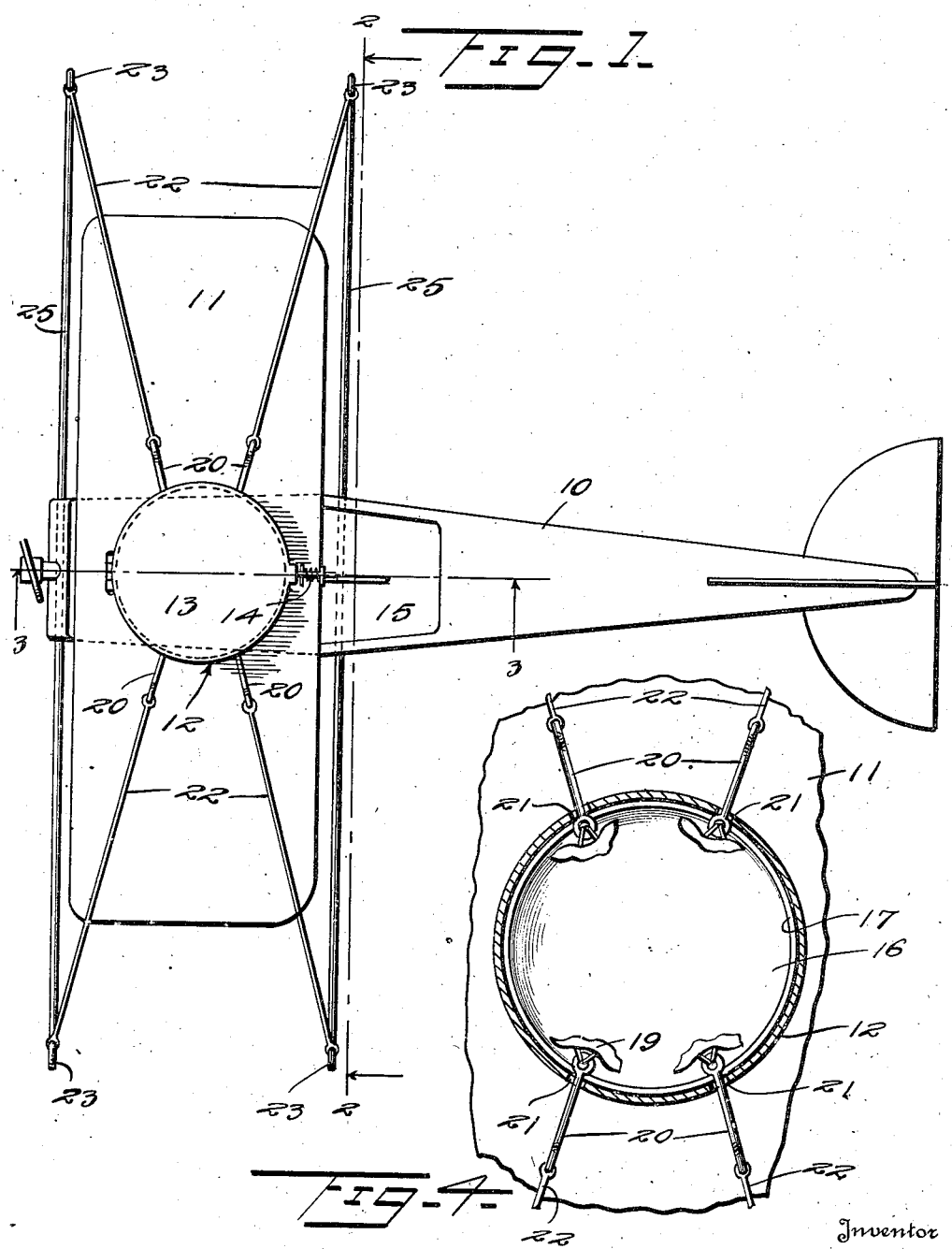

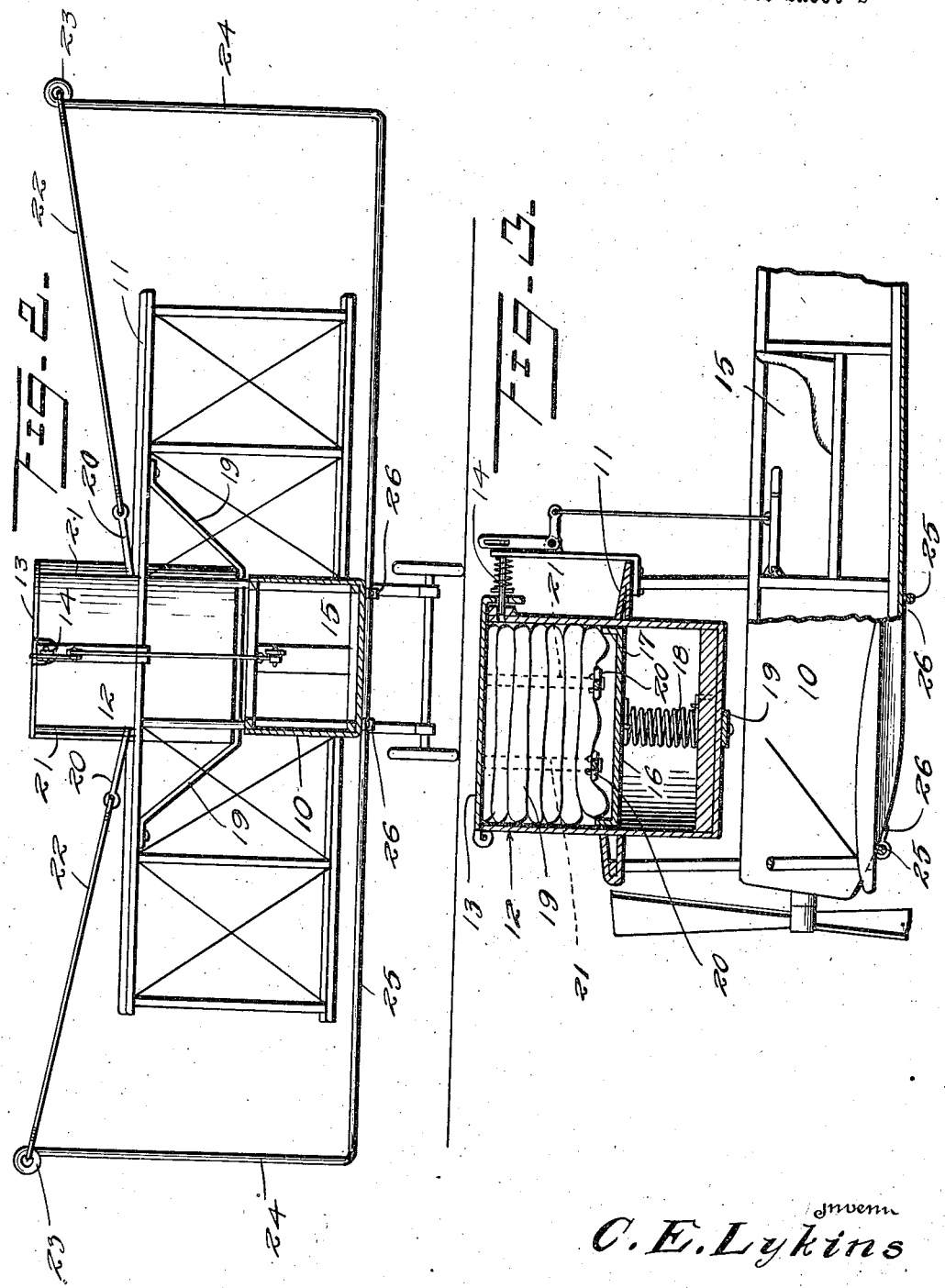

Patented Mar. 15, 1927.

1,621,019

UNITED STATES PATENT OFFICE.

CLARENCE E. LYKINS, OF SHAWNEE, OKLAHOMA, ASSIGNOR OF ONE-HALF TO H. D. HEWLETT, OF SHAWNEE, OKLAHOMA.

AEROPLANE.

Application filed October 19, 1926. Serial No. 142,702.

This invention relates to aeroplanes and more particularly to a parachute attachment for aeroplanes.

An important object of the invention is to provide a novel and improved means whereby a plane supporting parachute may be attached to and supported from the plane in such manner that when the parachute is in inoperative position, it will not materially interfere with the operation of the aeroplane.

A further object of the invention is to provide a novel and improved housing for the parachute having means for ejecting the same for use.

These and other objects I attain by the construction shown in the accompanying drawings, wherein for the purpose of illustration is shown a preferred embodiment of my invention and wherein:—

Figure 1 is a plan view of an aeroplane embodying a parachute constructed in accordance with my invention;

Figure 2 is a section on the line 2—2 of Figure 1;

Figure 3 is a section on the line 3—3 of Figure 1;

Figure 4 is a horizontal sectional view partially broken away showing the manner of connecting the guys with the parachute.

Referring now more particularly to the drawings, the numeral 10 generally designates the fuselage of an aeroplane and 11 the upper wing structure thereof. In accordance with my invention, this upper wing structure has directed therethrough a casing 12 having a hinged top 13. This hinged top may be held in closed position by a withdrawable latch pin 14, a control for which is located within the cock pit 15 of the fuselage and at a point convenient to the aviator.

Arranged within the casing is a plate 16 preferably having an upstanding flange 17. Secured to this plate is the upper end of a spring 18, the lower end of which is securely bolted to the bottom of the casing. The casing 12 should be partially projected through the upper wing and the lower portion thereof is rigidly connected with the wing by brackets 19 of any suitable description. The plate 16 is adapted to support and urge upwardly against the hinged cover 13 a folded parachute structure 19 of any suitable description. This parachute structure includes tether rings 20 which, when the parachute is folded within the container, extend into vertical slots 21 formed in the side wall of the casing above the upper surface of the wing 11. To these tether rings are secured the inner ends of guys 22, the outer ends of which are secured to eyes 23 formed upon the upper ends of vertical extensions 24 of horizontal metallic bars 25, the central portions of which are rigidly secured to the fuselage at 26.

In the use of the device, when it is desired to release the parachute, the operator withdraws the latch 14 releasing the hinged cover 13 and permitting the same to open. The spring 18 forces the plate 16 upwardly, projecting before it the parachute 19. The parachute is maintained in spaced relation to the plane by the standards provided by the vertical extensions 24 and guys 22 and is thus prevented from either damaging or becoming damaged by the plane. Any catching in the movement of the plate 16 is prevented by the provision of the flange 17 which serves as a guide maintaining the plate in proper position within the casing.

Since it will be obvious that the construction hereinbefore set forth is capable of a certain range of change and modification without materially departing from the spirit of the invention, I do not limit myself to such specific structure except as hereinafter claimed.

I claim:—

1. In combination with an aeroplane embodying a wing structure and a fuselage having the usual cock pit, a casing carried by the wing structure centrally thereof, a parachute within the casing, means normally urging the parachute from the casing, a latched lid for the casing, means within the cockpit for releasing the latch of said lid, bars rigidly secured to the fuselage and extending transversely thereof, the ends of said bars having upturned portions provided with eyes, the casing having slots in the side wall thereof and guy wires connected at their outer ends to the eyes of said supports and at their inner ends to members slidable in said slots and connected with said parachute.

2. In combination with an aeroplane embodying a wing structure and a fuselage having the usual cock pit, a casing carried by the wing structure centrally thereof, a parachute within the casing, means normally urging the parachute from the casing, a latched lid for the casing, means within the cock pit for releasing the latch of said lid, supports rigidly secured to the fuselage and embodying portions extending in spaced relation to the fuselage and wing of the aeroplane and connections between said portions of said supports and the parachute.

3. In combination with an aeroplane embodying a wing structure and a fuselage having the usual cock pit, a casing carried by the wing structure centrally thereof and having a latched lid, means within the cock pit for releasing the lid of the casing, a spring secured at its lower end to the bottom of the casing, a plate slidable within the casing and secured to the upper end of said spring, a parachute retained within the casing by the lid and secured to the aeroplane structure, the connections between the aeroplane structure and the parachute including elements directed through slots in the walls of the casing and supports in spaced relation to the wing and fuselage having flexible connections with said element.

In testimony whereof I hereunto affix my signature.

CLARENCE E. LYKINS.